Jan. 22, 1935.  B. GASPAR  1,988,891
METHOD OF PRODUCING PHOTOGRAPHS IN TWO OR MORE COLORS
Filed July 15, 1932
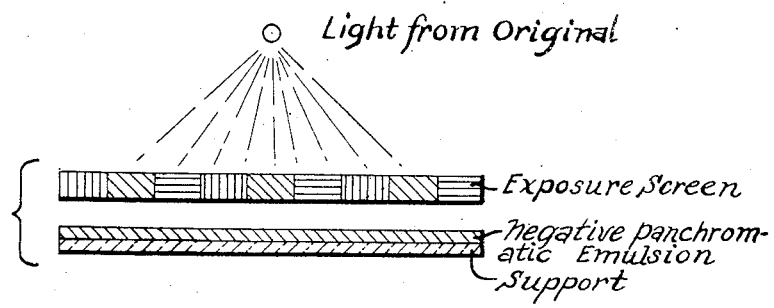
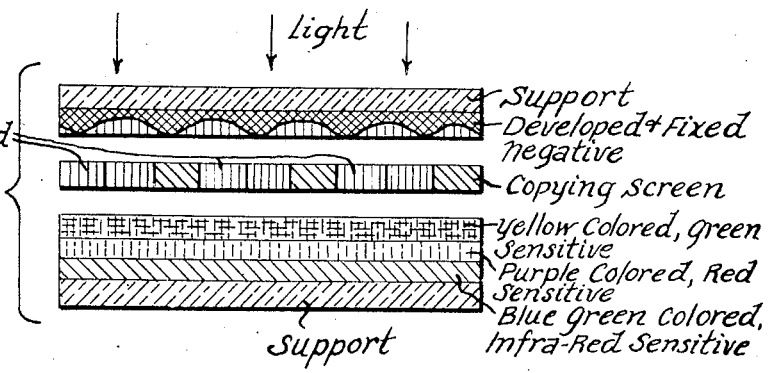
INVENTOR.
B. Gaspar
By Glascock Downing & Seebold
ATTORNEYS.

UNITED STATES PATENT OFFICE 1,988,891

METHOD OF PRODUCING PHOTOGRAPHS IN TWO OR MORE COLORS

Béla Gaspar, Berlin, Germany

Application July 15, 1932, Serial No. 622,639½
In Germany July 23, 1931

2 Claims. (Cl. 95—2)

This invention relates to a method of producing photographs in two or more colors.

A method has already been patented of producing multi-color pictures by copying from screen images on to sensitized materials comprising a plurality of layers, wherein the colors of the single screen elements are adapted to the properties of the multi-layer copying material by varying the transparency and the depth of color.

It is the object of the present invention to make use of this principle in copying photographic screen images on to colored multi-layer material made sensitive to different colors.

According to the invention, the exposure is made in accordance with the known duplex screen process, whereby a screen is employed, the elements of which are colored in the colors usual for three-color selection processes, for example red, green and blue-violet; or for producing a two-color picture in red-orange and blue-green. To enable copying to be performed on to layers of material which are colored intensely in different colors, there is employed, according to the invention, for the purpose of performing copying with the original negative, or a diapositive produced from the same, a second color screen placed in contact, which screen possesses a pattern congruent to that of the screen employed for the exposure; the elements of the screen, however, are colored differently to those of the first screen.

Thus, for example, there is employed for the purpose of exposure a screen which possesses elements colored in red, green and blue, and in which the colors of the screen elements are extremely pervious to light, for example are tinged with colors in which the single spectral zones overlap. For copying purposes there is employed a screen, the elements of which are colored an intense red, green or blue, having in each case a very narrow range of perviousness. According to the invention, however, there may also be employed for reproduction or copying purposes a screen, in which the elements thereof possess a coloring which is independent of the color of the screen elements employed for the exposure; for example, in place of the filter elements of the exposure screen allowing the passage of red rays, a screen may be employed having a congruent pattern and allowing merely the passage of infra-red. In place of the green filter element one may be employed allowing the passage of merely red-orange, and in place of the blue element one allowing the passage of merely green. In this case the coloring of the single screen elements has been moved towards the red end of the spectrum. The procedure, however, may also be such that for the purpose of reproduction the one primary color is omitted, as already described in the above example, one primary color, however, being employed in two spectral zones of different perviousness. For instance, the element pervious to blue is omitted, and in place thereof there is employed a screen element congruent thereto allowing the passage of merely blue-green, i. e., between approximately 490 m$\mu$ and 550 m$\mu$, and in place of the green filter there is employed in the copying screen a congruent element possessing a yellowish-green coloring and pervious in the range of approximately 550–600 m$\mu$. The third screen element may be pervious either to infra-red, of approximately 680 m$\mu$ upwards, or red-orange. It is also possible, however, to employ as third screen element, omitting an element pervious to red, a filter element which is pervious only to ultra-violet. The coloring of the filter elements of the screen depends, in the manner described in my prior patent (application Ser. No. 414,563 filed December 16, 1929), merely on the properties of the multi-layer copying material, or on the sensitiveness or spectral perviousness of the single part layers acted upon by the single part-images, i. e., the light passing through the single screen elements.

The following arrangements may be employed: There is taken for example a screen containing blue, green and red elements. In place of the blue filter element there may be used in the reproducing screen a filter element pervious to red, green or blue, in place of the green filter a filter element pervious to blue, infra-red or yellowish green, and in place of the red filter an element pervious to infra-red, blue or red. The form and the surface ratio of the single screen elements may naturally be selected as desired; for example, regular line screens or screens having regular squares may be employed. As already described in my prior patent (application Ser. No. 414,563 filed December 16, 1929), the total color of the exposure screen does not require to result in a neutral grey, and the mixed color of the screen elements may be in any desired shade.

The advantages of the new method reside above all in the fact that for the purpose of exposure an extremely transparent screen may be employed, and upon the reproduction copying may be performed on to intensely colored layers, which by addition of their absorptions are wholly impervious to the visible bright light. As described in a separate patent, these layers act as protective and selection filters for the layers situated thereunder. If, for example, the uppermost layer is colored yellow, the middle layer purple red, and the undermost layer blue, the red light penetrating as far as the undermost, intensely blue-colored layer will be absorbed on the surface of the latter. The blue and green portions of the spectrum will be absorbed in the layer situated above. The total effect of this layer is that the single layers act as light filters, and, for example, merely the infra-red rays of the copying light act on the undermost blue-colored layer.

According, therefore, to the invention, it is possible for copying purposes to select the filter elements of the reproducing or copying screen in colors which allow the passage of the particular light for each single layer. In accordance with the invention, the color of one or more screen elements may be so chosen that the latter are no longer pervious to the visible bright light. For example, the one element may be pervious only to infra-red, and the second only to ultra-violet. The third element is pervious to a particular color as desired. This third color and also all colors of the copying screen will depend only on the tinging or perviousness of the part layers employed for copying purposes.

As already described in the above, these part layers are so colored that the perviousness decreases with increasing depth of layer, or as the number of layers increases. This arrangement, as regards the undermost layer, results positively in merely one possibility of influence by light, and these layers must accordingly be exposed to a light which is capable of penetrating to the depth in question. Assuming the blue part-image is situated in the undermost layer, the appertaining red part-image will require to be copied with infra-red. If, for example, the undermost part-layer is colored purple red, this layer naturally calls for infra-red sensitiveness or perviousness to red. In this case, of course, the green element of the exposure screen requires to be replaced in the copying screen by the element pervious to infra-red. The coloring of the filter elements may also be dependent on the coloring of the copying layers. For example—if the uppermost layer is colored an intense yellow, all three filter elements, including the infra-red filter element, may be pervious to blue since, as revealed by the properties of these copying layers, these are insensitive to blue. The difference between the filter pervious to infra-red and that impervious thereto will reside in the fact that the red and the blue filter element contain additions which absorb the infra-red. For example—tinging with naphtol green is suitable for this purpose.

By way of example, the production of a two-color image is here given. A panchormatic (ordinary) plate is placed in contact with a regular screen consisting of red and green filter elements. After exposure in the camera the two plates are again separated, and a reverse positive is produced in known manner. This positive shows an image of the object taken with different black lines corresponding with the screen elements.

This black-and-white image bearing the color selections of the line screen is copied on to a material composed of two layers. If a red layer and a green layer were superimposed and employed as copying material, this could not be exposed as the top, red layer, would allow only red light to pass to the underneath green layer, which light would be absorbed by the latter, so that the same would have no photo-chemical effect.

According to the invention, the copying screen must be adapted to the copying material. The upper, red layer, is sensitized in respect of light short-wave red, and the underneath layer in respect of infra-red.

The copying screen is produced as follows: The line screen elements corresponding with the red screen portions of the image taken are colored red, viz., in such fashion that infra-red is absorbed. The screen elements of the coloring screen corresponding with the green screen portions of the image taken are colored as desired, for example blue, with a dyestuff which however allows infra-red to pass through.

The copying screen is now registered with the black-and-white image taken, and when held against the light, a color image results in unnatural colors. The colors of this image serve merely for copying purposes.

This master image is now copied on to the material referred to in contact or by an optical process. The part sensitive to light red is able to act on the red layer, whilst the infra-red blue portion acts on the underneath green layer, which is sensitive to infra-red.

After exposure and development of the copied image, the dyestuff is decolored at the points corresponding with the developed metallic image, as described in the co-pending application Serial Number 572,232 filed October 30, 1931, for example with acid thiocarbamide solution.

The positive image thus ultimately obtained reveals the correct colors of the original.

With proper selection it is also possible in the same manner to produce three-color images.

The layers are for example, then produced in the following manner: A plurality of differently colored and sensitized layers are poured one over the other on to a backing, the undermost layer situated next to the backing being blue-green in color and sensitized in respect of infra-red. The following layer is purple-red and sensitized in respect of visible light red, whilst the uppermost layer is yellow and sensitized in respect of green.

A normal screen image cannot be copied on to layers colored in this fashion. For these layers it is necessary to employ a copying screen containing elements which are adapted to the penetration powers and particular sensitizations of the single layers. For example, there is employed for the undermost layer sensitive to infra-red a screen which allows the passage of infra-red, and for the purpose-red layers which is sensitized for red, there is employed a screen element allowing the passage of the light red rays but absorbing the infra-red rays. For the uppermost yellow layer there is employed a screen element allowing the passage of green. For copying purposes therefore there is employed a screen possessing elements, allowing the passage of red, infra-red and green.

The following examples may be quoted: The recording screen, as usual in the case of normal color selection, contains screen elements of 1000 to 600 m$\mu$ allowing the passage of red, elements or 600 to 500 m$\mu$ allowing the passage of green and elements of 500 to 400 m$\mu$ allowing the passage of blue. Recording is done in contact with a panchromatic plate. The panchromatic plate is now developed and fixed and copied on to a diapositive plate. Both the negative and the diapositive plate are merely black-and-white, and possess a pattern corresponding with the screen.

This is a copying screen. The copying screen discloses colored fields having the same size as those of the recording screen. The fields corresponding with the red filter allow, however, the passage of merely infra-red of 1000 to 680 mμ. The elements corresponding with the green filter will be colored red, and the penetration powers thereof amount to 680 to 600 mμ. The elements corresponding with the blue filter will be colored green, and have penetration powers amounting to 590 to 490 mμ. The effect of this screen is depicted in the accompanying drawing. The recording screen and the copying screen are so arranged in relation to each other, that the penetrations of the single screen elements are apparent, and also in what manner the powers of penetration of the recording screen correspond with the varied penetration of the copying screen elements by which those of the recording screen have been replaced.

The drawing represents a diagrammatical illustration of the differently colored and differently color-sensitized multi-layer copying material. In the same, the absorption curves of the layers have been included diagrammatically, whilst the sensitization of the single layers is indicated by asterisks, it being shown by means of arrows which element belongs to each layer. In the accompanying drawing, Fig. 1 represents the taking screen and Fig. 2 copying screen with developed and fixed negative and yellow, purple and blue-green layers.

For example, according to Fig. 1, the blue filter element of the recording screen is replaced by a green filter element in the copying screen. The green light which is allowed to pass by the green element of the screen acts on the uppermost yellow layer sensitized for green. The green filter element in the recording screen is replaced by a red filter element in the copying screen, and this acts on the red-sensitized, purple-red screen. The red filter element of the recording screen is replaced by the element in the copying screen allowing the passage of infra-red. This acts on the undermost blue-green layer sensitive to infra-red.

A somewhat modified arrangement is illustrated in Fig. 2, in which, for example, the green screen element, allowing passage between 600 and 500 mμ, is replaced in the copying screen by an element between 600 and 550 mμ, and this, as disclosed by the drawing, will then act on a layer colored with a purple-red dyestuff, which layer possesses an absorption gap in yellow-green and is sensitized in respect of yellow-green. The blue screen element of the recording screen is replaced in the copying screen by a blue-green element, which is pervious between 490 and 550 mμ. This acts on the uppermost yellow-colored layer, which reveals a gap in respect of the blue-green part of the spectrum and is sensitized for blue-green.

The red filter element of the recording screen is also replaced by an infra-red element in the copying screen, and this acts on the undermost blue-green layer, which is sensitized in respect of infra-red.

The copying layers are then developed and fixed, and additionally treated in accordance with the copending application Serial No. 622,812, to be converted into a colored image.

The mode of operation according to this invention is disclosed by the above examples. It will be apparent from the same what the nature of the copying screens requires to be in order that the same are adapted to the spectral sensitiveness and penetration of the copying layers to be employed.

It may be said, therefore, that the image allowed to pass by the red element of the recording screen is required to act on the blue layer, the image allowed to pass by the green element of the recording screen on the purple-red layer, and the blue-green element of the recording screen on the yellow layer.

If now the blue-green layer of the copying material is sensitive in respect of infra-red, the red element of the recording screen will be replaced by the element allowing the passage of infra-red. If the blue layer of the copying material is sensitive in respect of blue, the red element of the recording screen will be replaced by a blue penetrative element, or if it is sensitive to green, it will be replaced by a green-penetrative element.

The procedure is similar in replacing the green and blue elements of the recording screen by elements of the copying screen colored in other colors.

For exact register of the screens any suitable device may be employed, such, for example, as a copying frame, permitting of exact displacement of the screens and the negative or diapositive to be moved into alignment therewith, possibly with the assistance of one or more micrometer screws and control of the alignment by a lens. In accordance with the invention, this control may be performed in considerably more simple fashion by tinging the edge of the colored exposure screen in the manner known per se in one or more of the primary colors, for example a green or a green and blue tinge at the edge of the exposure screen or on either side.

Upon the exposure these points are also exposed, and a green or blue color impression results. If the exposure is combined with a differently colored copying screen, the negative or the positive copy is moved along the copying screen until that particular substitutory color appears at the edge by which the same color in the exposure screen has been replaced in the copying screen. For example—the green color appears in the color by which the green screen element has been replaced in the copying screen. If this, for instance, has been replaced by red, the green colored point appears in red color.

What I claim as new and desire to secure by Letters Patent is:

1. A method of producing multi-color photographs, consisting in exposing a silver halide layer behind a regular formed multi-color screen, the elements of which possess the usual colors in connection with screen exposures, then developing said silver halide layer and fixing the same in known manner, and thereupon printing from the film thus obtained on to a differently colored and differently sensitized multi-layer material in which the color of the various layers is independent of the color of the exposure screen by the elements of which possess the usual colors in congruent with the exposure screen, but in which the light transmission of the screen elements is adapted to the sensitizing of the single part layers, removing the copying screen and developing and fixing the positive material.

2. A method of producing multi-color photographs, which consists in exposing a silver halide layer behind a multi-color screen in which the colored areas are in a regular arrangement, then removing the said screen and developing and fixing the silver halide image, and thereupon printing the said image on a positive material, which comprises layers of light-sensitive material, each layer sensitive to a different region of the spectrum and each layer being colored in a color independent of one of the colors of the taking screen, through a second multi-color screen which is congruent to the first multi-color screen but the color of which corresponds to the sensitivity of the positive layers, removing the second multi-color screen and developing and fixing the positive material.

BÉLA GASPAR.